US009507781B2

(12) United States Patent
Potts et al.

(10) Patent No.: US 9,507,781 B2
(45) Date of Patent: Nov. 29, 2016

(54) SYSTEM AND METHOD FOR MOBILE PRESENTATION PROCESSING

(71) Applicant: JPMorgan Chase Bank, N.A., NY, NY (US)

(72) Inventors: Joel Potts, London (GB); Daniel Zinkin, London (GB); Bret Goldsmith, Sugar Land, TX (US); Deep Purkayastha, London (GB); Omar Siddiqi, London (GB)

(73) Assignee: JPMorgan Chase Bank, N.A., New York, NY (US)

( * ) Notice: Subject to any disclaimer, the term of this patent is extended or adjusted under 35 U.S.C. 154(b) by 196 days.

(21) Appl. No.: 14/132,152

(22) Filed: Dec. 18, 2013

(65) Prior Publication Data

US 2014/0325362 A1 Oct. 30, 2014

Related U.S. Application Data

(60) Provisional application No. 61/817,855, filed on Apr. 30, 2013.

(51) Int. Cl.
G06F 3/00 (2006.01)
G06F 17/30 (2006.01)
G06F 17/21 (2006.01)
G06F 3/0481 (2013.01)

(52) U.S. Cl.
CPC ....... *G06F 17/30058* (2013.01); *G06F 3/0481* (2013.01); *G06F 17/211* (2013.01)

(58) Field of Classification Search
CPC ..... G06F 3/0481; G06F 17/24; G06F 17/211
USPC ......................... 715/730, 731, 732
See application file for complete search history.

(56) References Cited

U.S. PATENT DOCUMENTS 8,365,081 B1 * 1/2013 Amacker ............... G06Q 10/10
715/748
8,788,493 B2 * 7/2014 Stallings ........... G06F 17/30265
707/724
2003/0160813 A1 8/2003 Raju
(Continued)

OTHER PUBLICATIONS

PCT International Search Report, Sep. 18, 2014.
PCT Written Opinion, Sep. 18, 2014.

*Primary Examiner* — Haoshian Shih
(74) *Attorney, Agent, or Firm* — Goodwin Procter LLP

(57) ABSTRACT

The invention comprises a system and method using a software application ("app") running on portable computing devices to download presentations from a central server as thumbnails and manipulate the presentations in thumbnail format. The thumbnails can provide a storybook-type presentation that takes much less memory on a portable device than full native presentation format files. With the thumbnail file, the portable device user can move from slide to slide, reorder slides, delete slides, add slides from other thumbnail files, and add notes/text. After a new presentation is created using one or more thumbnail files, it may be uploaded to a central server where a server-side application recompiles the new presentation into a native format presentation from the thumbnail format. In this manner, presentations can be sourced from virtually anywhere and using nearly any computing device from which one can view thumbnail presentations. Other variations and enhancements are disclosed.

28 Claims, 18 Drawing Sheets

(56) References Cited

U.S. PATENT DOCUMENTS

| | | |
|---|---|---|
| 2006/0277452 A1 | 12/2006 | Villaron et al. |
| 2011/0295879 A1* | 12/2011 | Logis ............................ 715/764 |
| 2012/0110036 A1 | 5/2012 | Rabii |
| 2012/0226760 A1 | 9/2012 | Lewis |
| 2012/0226823 A1 | 9/2012 | Livnat et al. |
| 2013/0097502 A1 | 4/2013 | Langmacher et al. |
| 2014/0260904 A1* | 9/2014 | Daniels ................ G09B 15/023 84/483.2 |

* cited by examiner

SYSTEM AND METHOD FOR MOBILE PRESENTATION PROCESSING

CROSS-REFERENCE TO RELATED APPLICATION(S)

The present application claims priority to U.S. Provisional Patent Application No. 61/817,855, filed Apr. 30, 2013, which is incorporated herein by reference in its entirety.

FIELD OF THE INVENTION

The present invention relates generally to presentation document processing, and more particularly, to a system and method providing for remote processing of presentation documents amenable for use on portable computing devices.

BACKGROUND OF THE INVENTION

Preparation and processing of presentation documents (e.g., slideshows, "decks", or "pitches" created with Microsoft® PowerPoint® or similar software) can be extremely burdensome for enterprises, especially ones servicing large numbers of clients and pitching numerous potential clients. Just by way of example, there may be many different versions of a presentation for a financial institution to explain its products and services to institutional investors. If a senior executive requests a presentation directed to a particular type of institutional investor—college endowments, for example—the junior executive tasked with the assignment may have to review many existing presentations in order to pick and choose slides to go into the new presentation. This is particularly a challenge if either executive is using a portable device or mobile device with memory and processing limitations. For example, Microsoft® PowerPoint® files can be many megabytes in size so that accessing five, ten or twenty of such presentations using a tablet may not be practical or even possible in some cases. Memory size can limit the number of presentations that can be loaded. Processing and display constraints can make it difficult to switch or toggle between different presentations. In some cases, tablet or other portable devices may not provide software adequate to access certain types of presentation formats. For example, there is currently no fully-functional Microsoft Office suite for Android® devices or Apple iOS® devices. While there are alternative apps that purport to allow access to Microsoft® PowerPoint® files (e.g., Apple's Keynote® application, Polaris® Office, QuickOffice®, Documents to Go®, etc.), they tend to have limited utility and can be unreliable.

Senior executives have their own challenges with existing approaches to creating new presentations. For many, their practice for initiating a new presentation is to print out their old pitches and add hand-written notes before handing them to the junior executive. This approach become more and more archaic as technology has advanced. Senior executives travel with advanced mobile devices like tablets, but often do not have the tools to put those devices to effective use when it comes to creating or editing presentations. Furthermore, hard copies and hard-written notes are difficult to share among collaborators and even more difficult to organize or preserve for future projects.

What is needed is a system and method for an enterprise to allow mobile users to access presentation files, edit presentation files, and/or create new or updated presentation files in an efficient and practical manner that is consistent with the constraints on portable computing devices, system bandwidth considerations, configuration control, and security considerations.

Other problems and drawbacks also exist.

SUMMARY OF THE INVENTION

The invention is generally directed to a software application (sometimes referred to herein as an "app") that can run on portable computing devices (e.g., an Apple iPad device, as well as other tablets, netbooks, smart phones, mobile devices, etc.) that allows presentations to be downloaded from a central server as thumbnails that users can access and manipulate to create updated presentations. Portable computing devices may be referred to hereinafter as "portable devices" and are understood to encompass mobile devices. The app that executes on portable devices according to the invention is sometimes referred to herein as "iPitch" client software or "iPitch App." The thumbnails, generated from native format presentation file(s), can provide a storybook-type presentation on a portable device that takes much less memory than full native presentation format files.

Although described particularly with regard to Microsoft® PowerPoint® (also referred to herein as ".ppt" or PPT files) presentation processing, the present invention may be adapted for other presentation application formats (e.g., Apple's Keynote®, Google Docs® Presentations, Brainshark®, Slideshark®, PreZentit®, Prezi®, Vuvox®, Adobe Flair®, SlideRocket®, SlideSnack®, etc.) could be used with the invention. Preferably, the thumbnails are in PDF format, wherein one slide may be represented by one corresponding PDF file, although other file formats (e.g., GIF, JPEG, BMP, PNG, etc.) could be used in alternative embodiments of the invention.

With the thumbnail file, the portable device user can move from slide to slide, reorder slides, delete slides, add slides from other thumbnail files, and add notes/text or even richer content such as post-its, audio clips, drawings, and other edits allowable within an Adobe PDF document. After the iPitch App creates a new presentation using one or more thumbnail files, the presentation may be uploaded to a central server where a server-side application recompiles the new presentation into a PowerPoint® presentation from the thumbnail format. In this manner, presentations can be sourced from virtually anywhere and using nearly any computing device from which one can view thumbnail presentations.

According to one aspect of the invention, should the user desire to email a new presentation, the actual file is transmitted from the central server instead of directly from the user's portable device to the destination. (The user device normally only has the thumbnail version, not the compiled .ppt file, which resides on the server). Using the central server as an intermediary allows it to centrally manage and control dissemination of presentation files. For example, a record can be stored when a file is emailed. If a sign-off or other approval is required prior to dissemination, the central server can restrict sharing until the approval is secured. Header data can be inserted into the presentation files reflecting any restrictions.

According to one embodiment of the invention, the presentation content can be edited on a portable device by allowing the mobile user to input text that is tied to location coordinates on the thumbnail slide sent back to the central server. In recompiling the .ppt file, the server may insert the text into the .ppt slide at the corresponding location. There may also be "variable fields" (e.g., a field listing the name of the company being pitched) that the user can complete using the thumbnail file and the server can include in the recompiled file.

According to another aspect of the invention, system and methods of the present invention allow for movies and animations or other "smart parts" to be inserted into presentations when recompiling the thumbnail files. The central server may also be instructed to include dynamic or variable contents, such as up-to-date stock charts concerning potential clients and interactive mapping of assets, into recompiled presentations.

Security can be addressed in various ways according to certain embodiments of the invention. In some cases, compiled presentation files can be transmitted outside an enterprise (e.g., to a third party) only as PDF files. The file headers may include "blocking codes" detected by the enterprise's email service that prevent the file from being emailed outside the enterprise, for example, unless certain business or security rules are met. According to another aspect of the invention, security may employ so-called file-wrapping techniques such that unwrapping of a presentation file by a third party will cause an email to be sent to the enterprise. Such notice emails can then be compared to records to ensure the person accessing the presentation file is an intended recipient. According to yet another aspect of the invention, file watermarks may indicate intended recipients and/or timestamps, when a document was sent/received, etc.

Accordingly, it is one object of the present invention to overcome one or more of the aforementioned and other limitations of existing systems and methods for presentation document processing by providing a platform for centralizing the creation and distribution of new pitches and facilitating mobile processing of presentation files.

It is another object of the invention to provide systems and methods for presentation document processing that allow portable device users to access multiple existing presentations in order to develop a new presentation.

One technical effect of the invention is to provide systems and methods for presentation document processing that allow portable device users to develop and/or new presentations without having to run a native presentation program such as Microsoft® PowerPoint®.

Another technical effect of the invention is to facilitate efficient and effective collaboration among different users on the preparation, review, and revision of presentation files.

Yet another technical effect of the invention is the centralized electronic control, organization, and tracking of presentation files for an enterprise dealing with a large number of pitches to a large number of clients.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements.

DETAILED DESCRIPTION OF THE INVENTION

Figure 1:
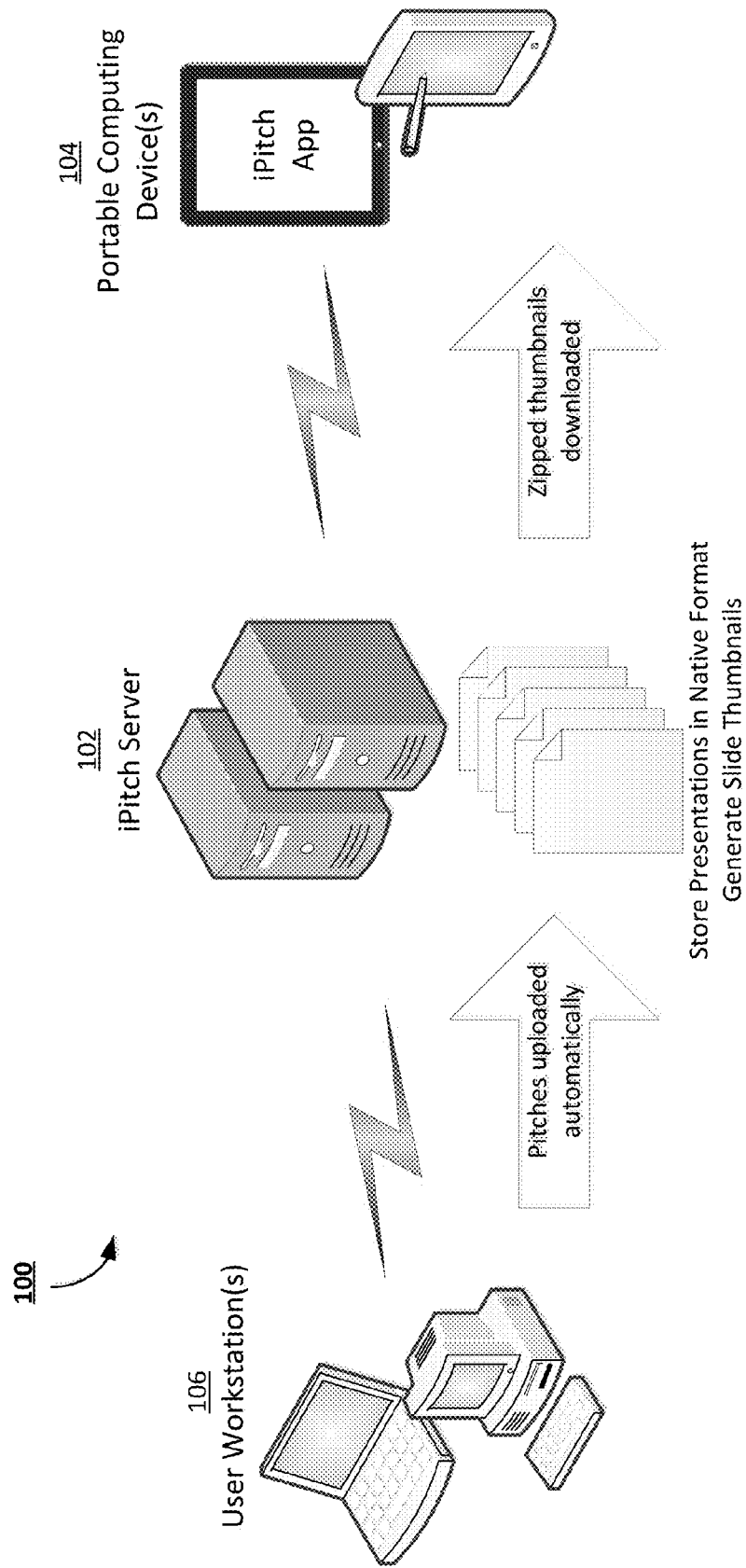
FIG. 1 is a block diagram illustrating an exemplary system for processing presentation files according to one embodiment of the invention.

The invention is generally directed to a computer-implemented system and method, including related software, for mobile presentation processing.

According to one aspect of the invention, a software application ("app") can run on portable computing devices (e.g., an Apple iPad, as well as other tablets, netbooks, smart phones, mobile devices, etc.) to allow presentations to be downloaded from a central server as thumbnails, and users can access and manipulate the downloaded thumbnail format presentations to create updated presentations. Portable computing devices may be referred to hereinafter as "portable devices" and are understood to encompass mobile devices. The app that executes on portable devices according to the invention is sometimes referred to herein as "iPitch" app. According to one embodiment, an iPitch suite may be provided, which includes an iPitch mobile application, as well as the corresponding desktop component.

The thumbnails can provide a storybook-type presentation that takes much less memory than full native presentation format files. With the thumbnail file, the portable device user can move from slide to slide, reorder slides, delete slides, add slides from other thumbnail files, and add notes/text. According to one embodiment of the invention, content can be added by allowing the user to input text that is correlated to location coordinates on the thumbnail slides sent back to the central server. In recompiling the .ppt file, the server may insert the text into the .ppt slide at the corresponding location. There may also be "variable fields" (e.g., a field listing the name of the company being pitched) that the user can complete using the thumbnail file and the server can include in the recompiled file.

Embodiments of the present invention may provide a platform for centralizing the creation and distribution of new presentations ("pitches") and allow user collaboration in the iPitch platform, reducing reworking effort and maximizing knowledge share and reuse. After iPitch creates a new presentation using one or more thumbnail files, the presentation may be uploaded to a central server where a server-side application recompiles the new presentation into a PowerPoint® presentation from the thumbnail format. According to embodiments of the invention, various content types, such as movies and animations, may be inserted into presentations during recompilation at the server. In this manner, presentations can be sourced from virtually anywhere and using nearly any computing device from which one can view thumbnail presentations.

According to one aspect of the invention, the central server may not only organize and manage the presentation files but also distribute new pitches to clients based on user instructions and on behalf of the users. The pitches may appear to originate from the users directly even though the user device normally only has the thumbnail version, not the compiled .ppt file stored at the server. The central server, as an intermediary, can therefore manage and control dissemination of presentation files, for example, by maintaining a record of when a file is emailed, ensuring the appropriate sign-off or other approval occurs prior to dissemination, and restricting sharing until the approval is secured.

FIG. 1 is a block diagram illustrating an exemplary system 100 for processing presentation files according to one embodiment of the invention. The system 100 may comprise a central server 102 (referred to herein as "iPitch Server") and one or more portable computing devices 104. According to embodiments of the present invention, authorized users of the portable computing devices 104 may preferably also have access to workstation(s) 106 such as full-functioned desktop or laptop computers.

As shown, the system 100 (and related software) is implemented based on computing equipment. Generally, it should be noted that the components depicted and described herein may be, or include, a computer or multiple computers. Although the components are sometimes shown as discrete units, they may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types. For example, a server may comprise a single server or a group of servers used to service users. Additionally, a server may comprise a front-end web server and a back-end database server. Alternatively, those functions can be integrated into a single server device.

Those skilled in the art will appreciate that the invention may be practiced with various computer system configurations, including hand-held wireless devices such as mobile phones, tablets or PDAs, multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computing devices (e.g., mobile devices, lap-tops, desk-tops, etc.) typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or Apple iOS operating systems, Google Android operating system (and variations thereof), Microsoft Windows® operating system (desktop and/or mobile version), the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system or platform.

User applications may be so-called stand-alone applications executing on user devices or they may be client-server type applications that interface with server-side components. They may include applications provided by the server, such as Java Applets, that may be delivered with web pages.

The memory will include at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer may include a plurality of software processing modules stored in a memory as described herein and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, processor, CPU (Central Processing Unit), programmed micro-processor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It is appreciated that in order to practice the invention as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described herein is performed by various components and various memories. However, it is appreciated that the processing performed by two distinct components as described herein may, in accordance with a further embodiment of the invention, be performed by a single component. Further, the processing performed by one distinct component as described herein may be performed by two distinct components. In a similar manner, the memory storage performed by two distinct memory portions as described herein may, in accordance with a further embodiment of the invention, be performed by a single memory portion. Further, the memory storage performed by one distinct memory portion as described herein may be performed by two memory portions, for example.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. Input devices include those that recognize hand movements or gestures, such as in the case of gesture set supported by Android or the swipe movements recognized in iOS-based devices. These and other input devices are often connected to the processing unit through a user input interface that is coupled to the system bus, but may be connected by other interface and bus structures, such as a parallel port, game port or a universal serial bus (USB).

A user interface may include any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the invention, it is not necessary that a human user actually interact with a user interface used by the processing machine of the invention. Rather, it is also contemplated that the user interface of the invention might interact, i.e., convey and receive information, with another processing machine, rather than a human user. Further, it is contemplated that a user interface utilized in the invention may interact partially with another processing machine or processing machines, while also interacting partially with a human user.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described herein.

Various networks may be implemented in accordance with embodiments of the invention, including a wired or wireless local area network (LAN) and a wide area network (WAN), the Internet, wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra- Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Specifically, the iPitch Server 102 may include at least one server computer typically configured as part of an enterprise network and connected to the Internet through a firewall. An exemplary hardware and software architecture of the iPitch Server 102 is described in more detail below in connection with FIG. 4.

The portable computing devices 104 may include mobile personal computers, such as tablets (e.g., Apple iPad or iPad Mini, Samsung Galaxy tablet, Google Nexus tablet, Amazon Kindle and Kindle Fire etc.), PDAs (personal digital assistants), smart phones (e.g., the Apple iPhones, Samsung Galaxy S series or Note series smart phones, etc.), netbooks, and other forms of portable computer devices. The portable computing devices 104 typically have less powerful processors and limited storage capabilities as compared to full-functioned personal computers. The portable computing devices 104 are preferably capable of network communications based on Wi-Fi or cellular network connections, so that they may exchange data with the iPitch Server 102 and/or other networked devices.

In contrast, the user stations 106 are typically full-functioned personal computing devices with significant computing power and ample storage space as well as networking and security capabilities.

According to embodiments of the present invention, the system 100 may employ a suite of software programs (referred to as "iPitch suite") for processing of presentation files. The iPitch suite may include: (a) the iPitch host programs running on the iPitch Server 102; (b) an iPitch App installed to run on each of the portable computing devices 104; and (c) a desktop application or desktop bot running on each user workstation 106.

In operation, the iPitch Server 102 may be mainly responsible for storing presentation files (mostly in native format(s) such as Microsoft PowerPoint), slides, slide templates, and so-called "smart parts" (e.g., multimedia content and dynamic content) that could be made part of a presentation file based on user instructions. The iPitch Server 102 is also responsible for generating slide thumbnails from the native format presentation files. For instance, upon a mobile user's request for a particular presentation file, the iPitch Server 102 may operate the server-side software to convert or translate the presentation file from its native format (e.g., .ppt) into thumbnail (e.g., .pdf) files. The generated thumbnails may be downloaded to the portable computing devices 104, for example, in a zipped or other compressed format. Conversely, the iPitch Server 102 may execute software for receiving thumbnail-based files that can be recompiled or converted back into native format files (e.g., a new PPT file).

The desktop application or desktop bot may allow a user to select a folder in his/her workstation 106 to add all pitches he/she wants to have available in the iPitch App. The desktop bot may also be configured to automatically upload pitches to the iPitch Server 102. Also, the user may be able to send via email old pitches for use as a basis for creating new ones. For iOS based portable computing devices 104, the desktop application may or may not employ Apple iTunes software to synchronize content of the desktop pitch folder with that of the iPitch App on the portable computing devices 104.

The iPitch App may provide a user-friendly interface, allowing the user to scroll and zoom in and out within pitches, while being in a context of state-of-the-art mobile components that will make a rich user experience. The mobile user may use the iPitch App to display, browser, search, edit, and/or annotate the thumbnail format presentation files (and/or individual slides) and may upload them back to the iPitch Server 102. For example, the iPitch App may facilitate browsing of pre-existing pitches or slides as well as creation of new pitches based on the existing ones. The iPitch App may also allow a user (e.g., senior executive) to add comments and instructions to a newly created pitch, so that once they send this content to other users (e.g., junior executives), they know how to edit the pitch accordingly.

Figure 2:
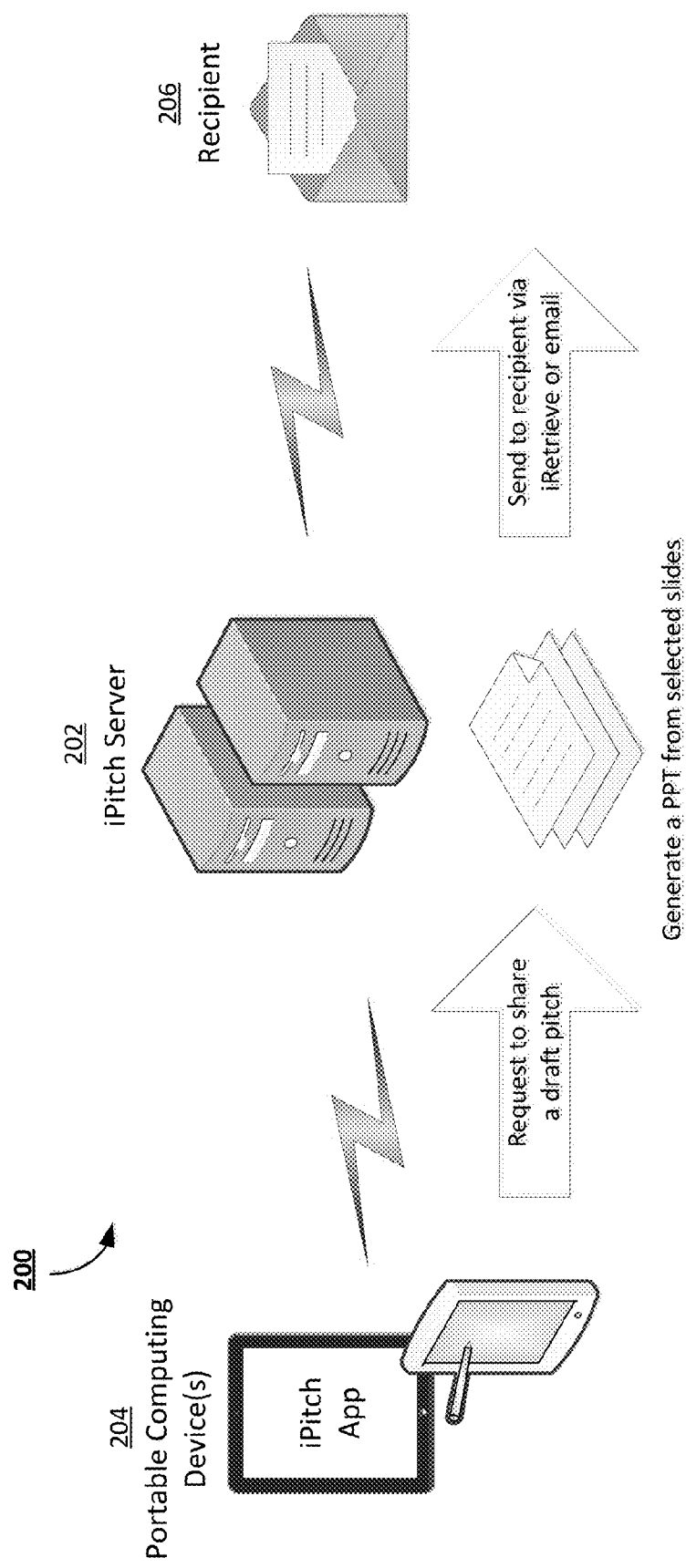
FIG. 2 is a block diagram illustrating an exemplary system for distributing presentation files according to one embodiment of the invention.

FIG. 2 is a block diagram illustrating an exemplary system 200 for distributing presentation files according to one embodiment of the invention. This computer-implemented system 200 may comprise an iPitch Server 202 and portable computing device(s) 204 in communication over a network with the iPitch Server 202. The iPitch Server 202 and the portable computing device(s) 204 may be similar to corresponding components of the system 100 described in connection with FIG. 1, as are the related software programs.

In operation, a user of a portable computing device 204 may cause the iPitch App thereon to issue a request to the iPitch Server 202 to share a draft pitch with a designated recipient 206. The pitch may be one already uploaded to the iPitch Server 202 or could be uploaded (in thumbnail format) concurrently with the request. The designated recipient 206 may be a colleague or collaborator of the user or a client outside the user's organization. Upon receiving the request, the iPitch Server 202 may generate a native format full presentation file from the draft pitch, for example, by assembling selected slides and inserting additional contents. Then, based on who the intended recipient is, the presentation file may be transmitted from the iPitch Server 202 in an appropriate format and via an appropriate channel. For example, for an internal recipient (e.g., a colleague working on the same pitch), the presentation file may be shared in its native format via iRetrieve document management system with no access restrictions. For an external recipient (e.g., a potential new client), the presentation file may be emailed as an attachment in PDF or other secure format with some access restrictions. However, the email transmission may be so configured that the message with attachment appears to come directly from the user requesting the transmission even though the user's device only has the thumbnail version.

Figure 3:
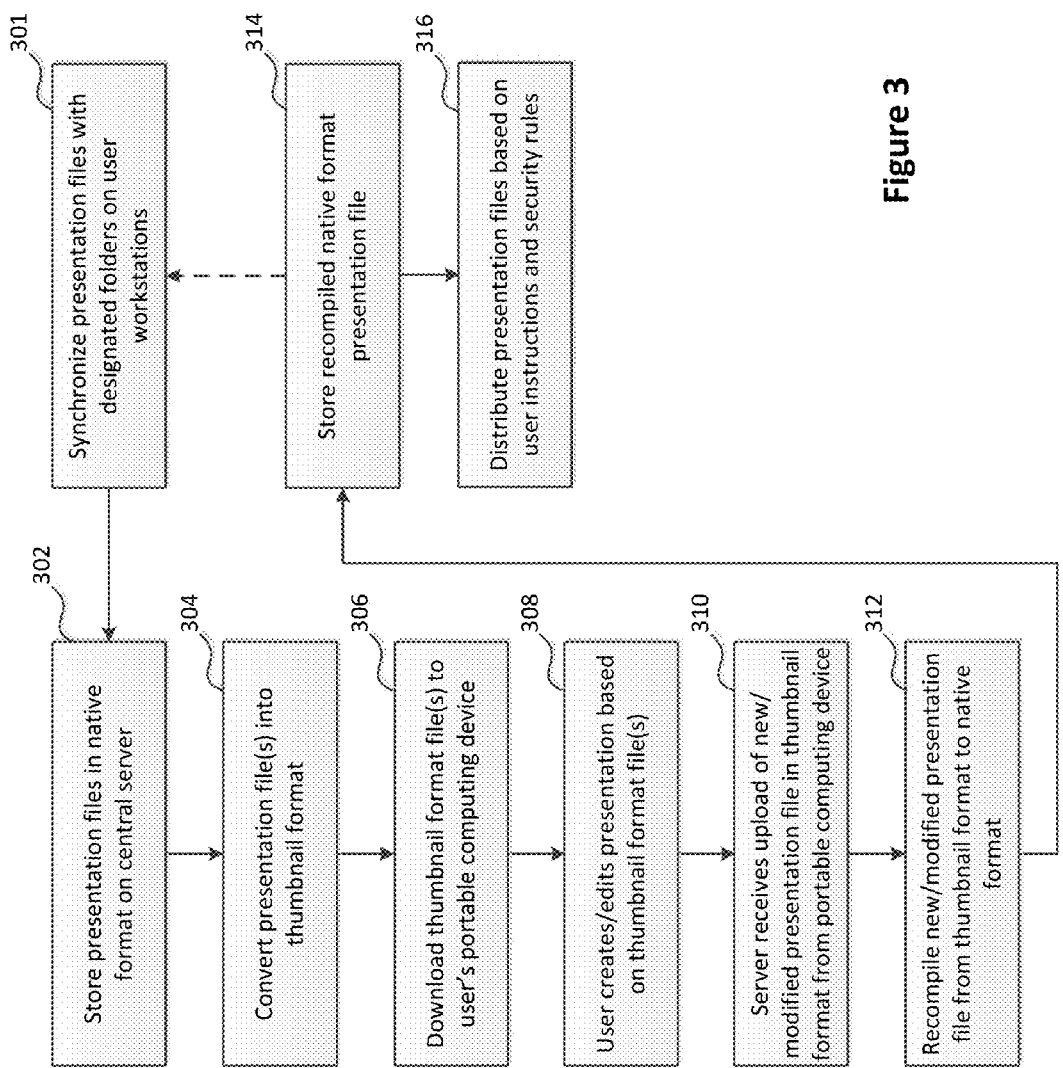
FIG. 3 is a flowchart illustrating an exemplary method for processing presentation files according to one embodiment of the invention.

FIG. 3 is a flowchart illustrating an exemplary method for processing presentation files according to one embodiment of the invention.

The exemplary method may start in Step 302 where presentation files are stored in native format on a central server (and/or related database(s)). The central server may be the iPitch Server described above or a similar central depository with document management functions. The presentations files may include old pitches, new draft pitches, and new finalized pitches. They may be organized and categorized much like in a typical document management system. The central server may also store and/or have access to individual slides, slide templates, model presentations, and slide/presentation components including so-called "smart parts." The presentation files and slides etc. may be stored in their native format such as Microsoft® PowerPoint® format. Components of presentation files or slides may be in their native format as well. For example, multimedia components may be in audio mp3 or video mp4 formats and animations may be in Flash Video (FLV) format.

Optionally, in Step 301, the presentation filed may be synchronized with designated folders on user workstations. For example, each authorized user may have a pitch folder on its workstation. Presentations in that designated folder may also be those the user would need on his/her portable computing device. Either the workstation or the central server may initiate a synchronization procedure between the local pitch folder and corresponding presentation files on the server. As a result, the presentation files on the server may be updated with a revised local copy; and conversely the locally stored presentation files may become updated with a revised server copy.

In Step 304, the central server may convert one or more presentation files into thumbnail format or other image format. The conversion may be done in batch before any request for the presentation file(s), or the conversion may be performed on demand, for example, upon receiving a request from a mobile device for a particular file. According to a preferred embodiment, the converted thumbnail files are in PDF format. According to alternative embodiments, file formats other than PDF, such as PNG, JPG, GIF, BMP etc. may also be suitable. It is also contemplated that the converted slide images need not be strictly "thumbnail" sized but may be of sufficient size and resolution for storage and display on portable devices with limited processing power and/or memory space. The conversion of slides or presentations from a native format to thumbnail format may also be an adaptive process based on the underlying content. For instance, if a slide includes exclusively or mainly text characters, then the converted thumbnail or image may be of a relatively low resolution with black-and-white color scheme. Similarly, a slide with charts or graphs may be converted to an image of intermediate resolution with moderate color richness, whereas a slide with photographs might be converted to a higher-resolution and color-rich image. The conversion may preserve the logical sequence of slides within the native format presentation file and may further include the existing comments or notes associated with each slide. According to one embodiment, the resulting files (e.g., .pdf files) may be named based on the original slide numbers, and the comments/notes may be included in PDF or image metadata or in a standalone metadata file referencing these files.

In Step 306, the converted thumbnail format file(s) may be downloaded to a user's portable computing device (e.g., an iPad device). According to one embodiment, the download may be carried out as part of routine synchronization of the portable device with a designated user pitch folder on the central server. According to another embodiment, the download may be performed on demand when the user requests a specific presentation file via the iPitch App on the portable device. For ease of transmission and organization, the thumbnails or other images may be further compressed into a zipped folder or file package. For security, the downloads may be encrypted and password-protected.

In Step 308, the user may display and browse the downloaded thumbnail format presentation files on the portable device and create or edit the presentations in thumbnail format. The downloaded thumbnails may be organized on the portable device according to slide decks and intended targets etc. The iPitch App on the portable device may allow the presentations to be selected and expanded into individual slides. The iPitch App may also allow the slides to be added, deleted, edited, annotated, duplicated, re-ordered, and saved. Thus, based on the downloaded thumbnail format presentation files or slides, the user could create a completely new pitch or edit an existing pitch. A new or updated presentation file may include user-inputted text which is correlated to individual slide images based on coordinates indicating intended text edit locations. The new or updated presentation file may also include user instructions for inserting or editing other content in the slides such as instructions to add, delete or modify non-text-box components of a presentation.

Then, in Step 310, the new or modified pitch(es) in thumbnail or image format may be uploaded to the central server from the portable computing device. The thumbnails may be preferably organized in a file package that may be compressed and optionally encrypted. The file package may include not only the thumbnail slide images but also associated notes, comments, edits, and/or instructions. The upload may be part of a routine content synchronization in a batch operation or performed on demand with respect to a specific pitch.

In Step 312, the uploaded new or modified presentation file may be processed by the central serve and recompiled from the thumbnail or image format into a native format. The recompilation or conversion may be based on the thumbnail slide images as well as the aforementioned notes, comments, edits, and/or instructions. For example, text edits may be incorporated into new or revised text boxes at the indicated coordinates within the corresponding slides. Notes and comments may be inserted to the corresponding notes or comments fields in the native format presentation file. Additional content, such as multimedia content or linked objects, may also be embedded according to user instructions. Accordingly, the package of thumbnails or slide images are recompiled into a consolidated, full-function presentation file (or slide deck) in a native format such as PowerPoint®.

In Step 314, the recompiled native format presentation file may be stored on the central server (or its database) and organized along with other presentation files. The recompiled native format presentation file may also be used to update local copies during synchronization with user workstations in Step 301.

In Step 316, one or more selected presentation files may be distributed to recipients based on user instructions and security rules. A user may send requests or instructions for the central server to forward a particular presentation file to a recipient. The central server may respond to the requests or instructions, for example, in a process outlined below in connection with FIG. 6.

Figure 4:
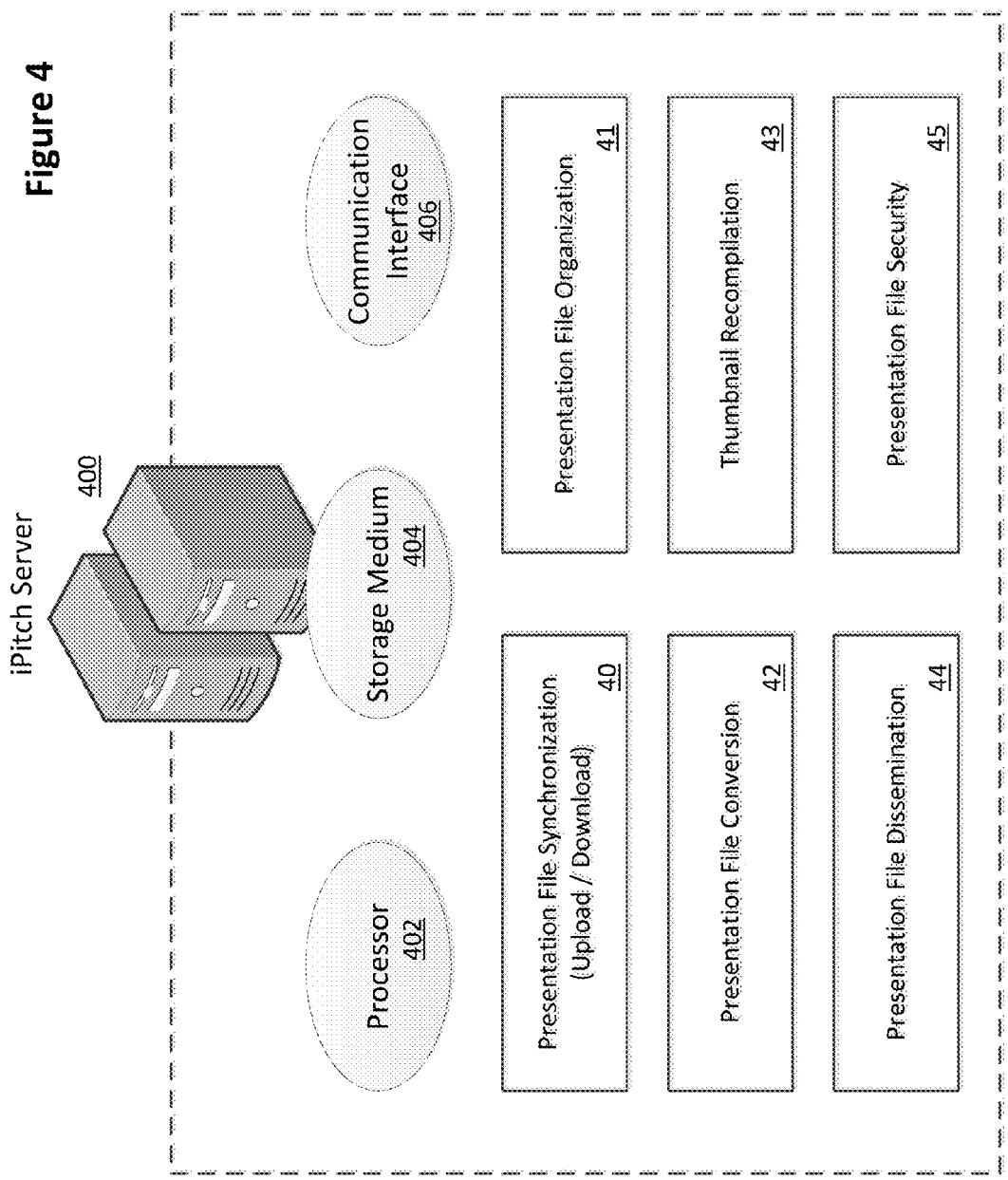
FIG. 4 is a block diagram illustrating an exemplary iPitch server according to one embodiment of the invention.

FIG. 4 is a block diagram illustrating an exemplary iPitch Server 400 according to one embodiment of the invention. In terms of hardware components, the iPitch Server 400 may comprise at least one processor 402, storage medium 404, and communication interface 406. In terms of software modules or functions as related to the iPitch suite, the iPitch server-side software may include exemplary functional modules such as Presentation File Synchronization 40 (for uploading and downloading presentation files in various formats between the iPitch server and portable computing devices as well as user workstations), Presentation File Organization 41 (for managing the storage and access of presentation files on the iPitch server), Presentation File Conversion 42 (for converting presentation files from a native format to a thumbnail or image format), Thumbnail Recompilation 43 (for converting presentation files from a thumbnail or image format to a native format), Presentation File Dissemination 44 (for controlling the distributions of presentation files and keeping a log of the distributions), and Presentation File Security 45 (for imposing security measures on the presentation files to restrict/control access).

Figure 5:
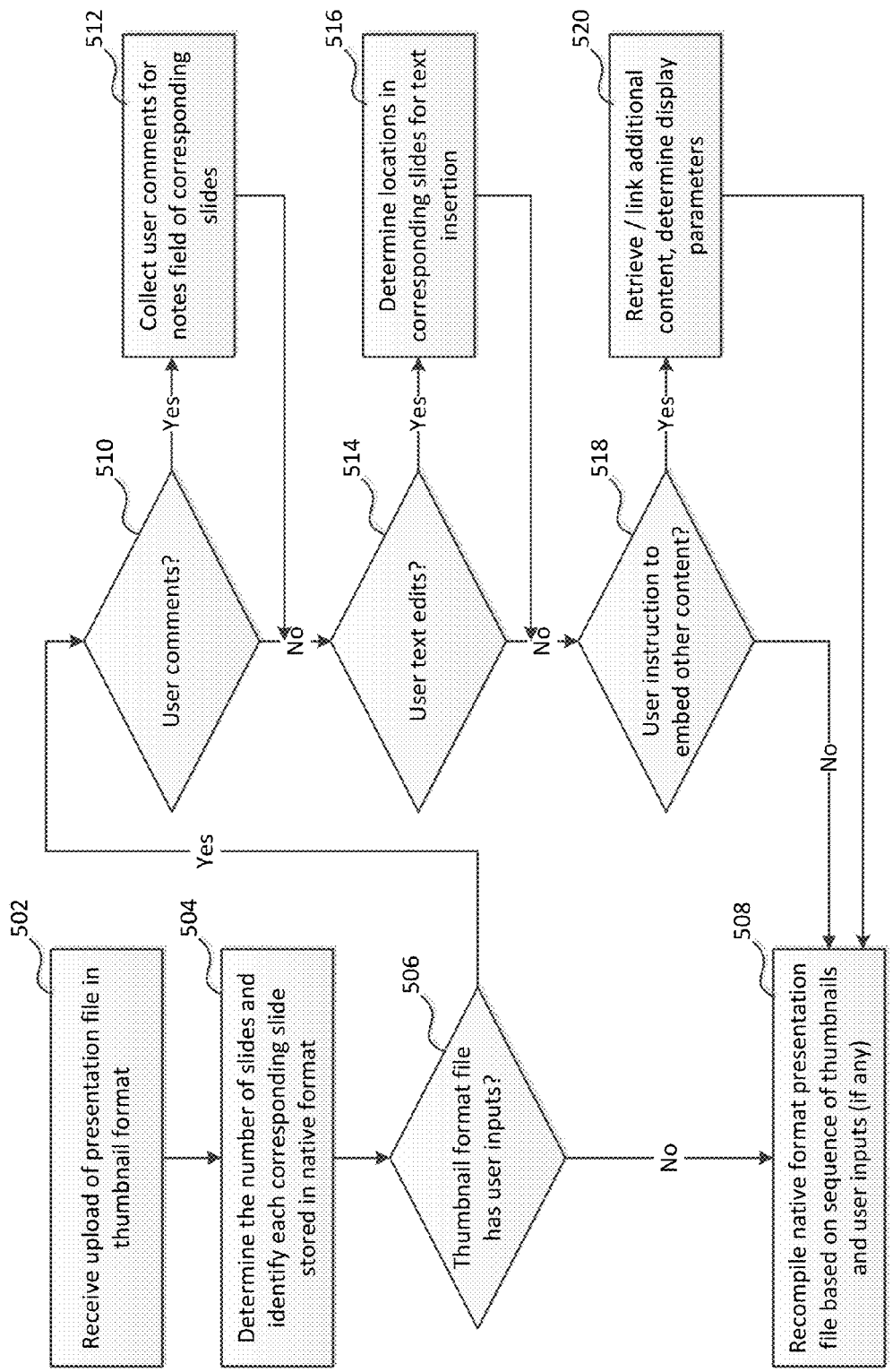
FIG. 5 is a flowchart illustrating an exemplary method for recompiling presentation files according to one embodiment of the invention.

FIG. 5 is a flowchart illustrating an exemplary method for recompiling presentation files according to one embodiment of the invention.

The exemplary process may start in Step 502 when an upload of a presentation file in thumbnail format is received at a central server. The process may also be initiated to batch recompile a set of previously uploaded thumbnail format presentation files. As mentioned above, each uploaded thumbnail format presentation file may include not only thumbnail slide images but also additional user input information such as associated notes, comments, edits, and/or instructions. Furthermore, the user inputs may include links to additional content to be incorporated into the edited slides, or the additional content may be uploaded to the server as well.

In Step 504, the number of slides may be determined for a presentation file and, if any of the thumbnail slide images have corresponding, preexisting native format slides stored on the server, those native format slides may also be identified.

In Step 506, it may be determined whether the thumbnail format presentation file includes or is associated with user inputs (e.g., notes, comments, edits, and/or instructions). If not, then the native format presentation file can be generated in Step 508 solely based on the sequence of thumbnails and by assembling their corresponding, preexisting slides in native format. That is, if they are not accompanied by any user input, the set of thumbnail slide images in the presentation file can be simply converted back to the original native format slides and then arranged in the same order as the thumbnails.

If it is determined in Step 506 that user inputs are present, then the process branches to Step 510 to determine whether the user inputs comprise user comments on particular slides. If so, then in Step 512 the user comments are collected for the notes field of the corresponding slides.

Otherwise or after Step 512, it is determined in Step 514 whether the user inputs comprise text edits. If so, then in Step 516 the desired location(s) in the corresponding slides are determined for text insertion.

Otherwise or after Step 516, it is determined in Step 518 whether the user inputs comprise user instruction to embed other content into the presentation. If so, then in Step 520 the additional content may be retrieved, linked, or otherwise located, and the display parameters may be determined for such content such as the display area of a video clip or chart/graph within a slide layout.

Otherwise or after Step 520, the process may continue on to Step 508 where the native format presentation file may be generated further based on these various user inputs such that the resulting presentation includes not only the base slides but also the additional contribution by the user such as the user comments, revised text fields, and additional content properly formatted and arranged. It should be noted that FIG. 5 only show some exemplary types of user inputs and is not intended as a limitation on the input types or how (or in what order) they are processed by the central server in the recompilation procedure.

Figure 6:
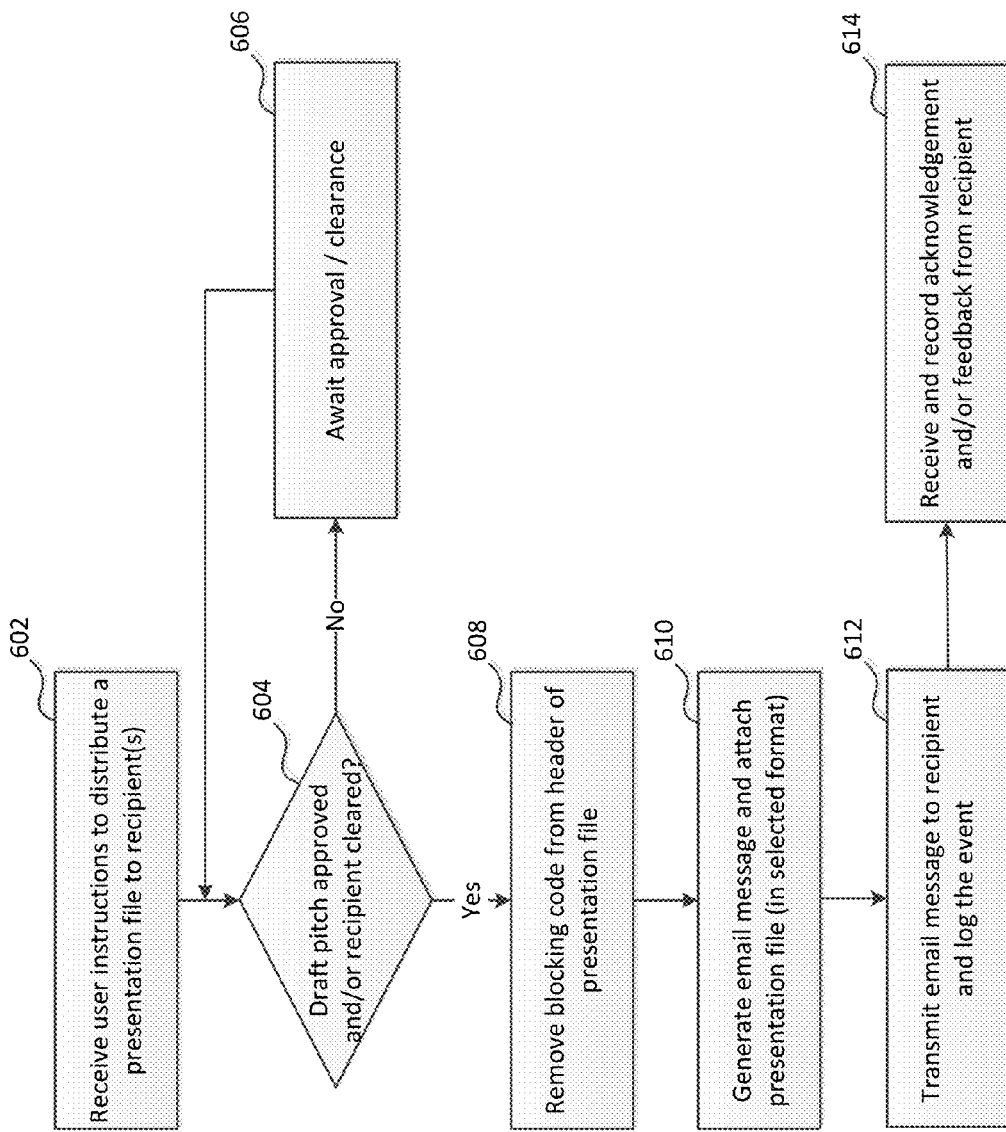
FIG. 6 is a flowchart illustrating an exemplary method for distributing presentation files according to one embodiment of the invention.

FIG. 6 is a flowchart illustrating an exemplary method for distributing presentation files according to one embodiment of the invention.

In Step 602, user instructions may be received at a central server to distribute a particular presentation file to one or more recipients.

In Step 604, it may be determined whether the presentation file requested has been approved or "signed off" by authorized personnel and/or whether the intended recipient(s) have been cleared to receive the file. According to one embodiment of the present invention, certain security measures may be implemented on the presentation files stored on the central server to prevent unauthorized dissemination or access of the pitches many of which contain non-public, sensitive information. According to one approach, blocking code may be inserted into a header field of each presentation file upon its creation where the blocking code may specify or signal restrictions placed on the file and prevent it from being circulated beyond the organization's private network or other designated recipient group without meeting certain conditions. For example, all outgoing email attachments (or presentation files about to be attached to an email message) may be subject to a scan of their header fields which will catch any presentation file that still has the blocking code embedded.

Thus, if a draft pitch has not been approved or its recipient has not been cleared, then the process branches to Step 606 to await approval and/or clearance. If the draft pitch has already been approved and the recipient cleared, then in Step 608 the blocking code (or any other security restrictions) may be removed from the presentation file, clearing it to be attached to an outgoing email message or be converted to other format (e.g., PDF) suitable for distribution.

Apart from removing the pre-existing security restriction, new security measures may be added to the distribution copy of the presentation file. For example, the outgoing copy could be flattened, encrypted, password-protected, and/or imposed with a view/print-only restriction. According to one example, a file wrapper may be added to the outgoing copy of the presentation file which would cause a notice to be sent back to the server or sender when the file wrapper is first opened. According to another example, the presentation file could be embedded with watermarks containing such information as time-and-date stamp, version data, intended recipient, confidentiality warning, and so on.

In Step 610, an email message may be generated and a copy of the presentation file in selected format may be attached to the message. Alternatively, a link to the presentation file may be included in the email message which allows the recipient to download the file from the same or a different server location. Although it is generated on and transmitted directly from the central server, the email message may be formatted to appear originated from the user requesting the distribution such that a reply or receipt may be directed to that user's email address.

Then, in Step 612, the email message with the attachment (or a link thereto) may be transmitted to the designated recipient(s). Upon successful transmission, the server may log the event for future reference such that all distributions of the presentation files could be tracked. If the email message fails to transmit or is bounced back, for example, the error may also be logged. In addition, in Step 614, any acknowledgement and/or feedback from the recipient(s) may be received by the server and recorded.

FIGS. 7-18 show exemplary screen shots of an iPitch app and its operations on a portable computing device according to one embodiment of the invention. Although these exemplary screen shots all show an Apple iPad device, it should be noted that the portable computing devices on which the iPitch App is installed and operated are not limited to Apple iOS tablets and could include any other tablet computers and smart phones.

Figure 7:
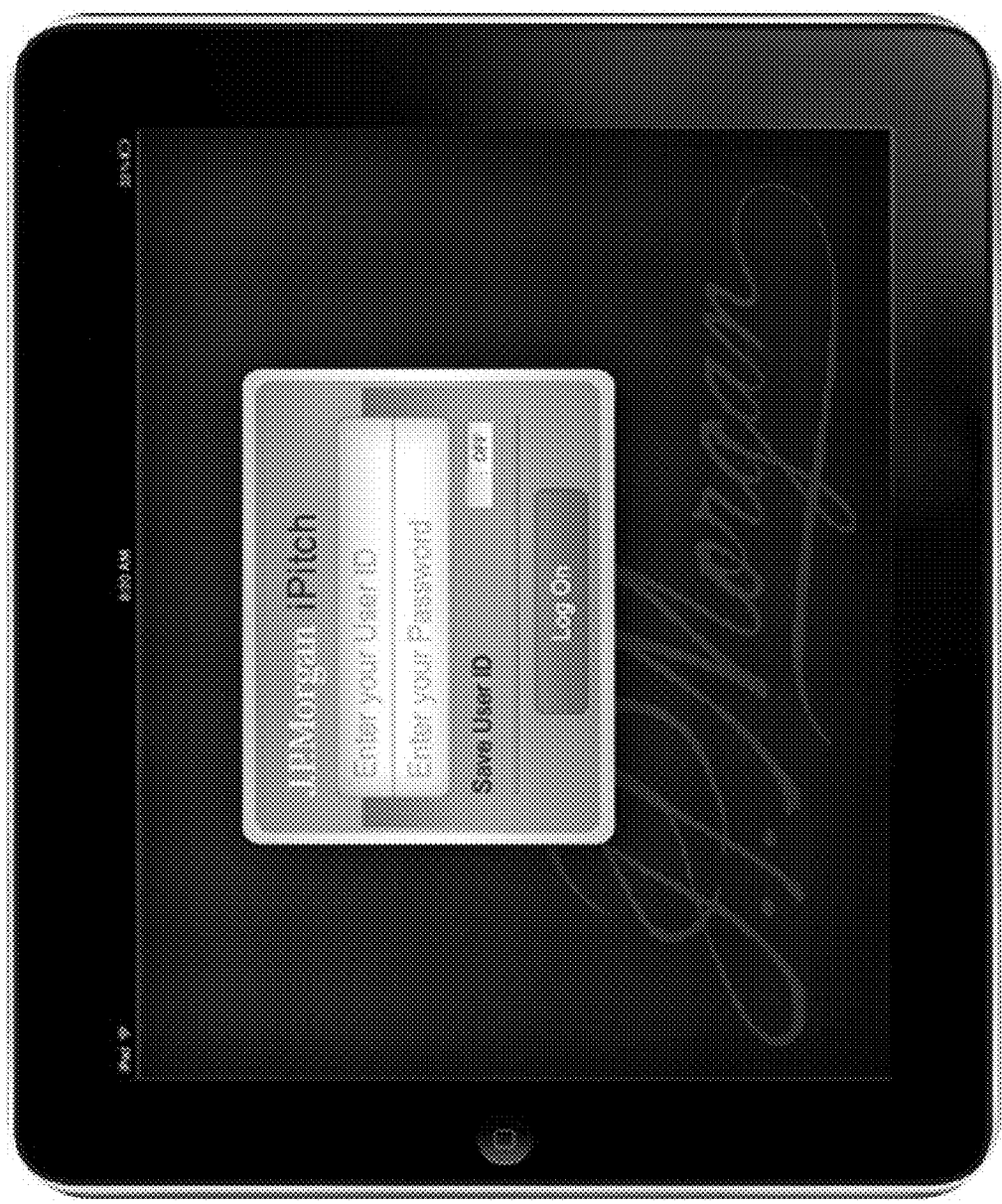
FIGS. 7-18 show exemplary screen shots of an iPitch app and its operations on a portable computing device according to one embodiment of the invention.

FIG. 7 shows an exemplary login screen for the exemplary iPitch iPad App which requires the input of User ID and Password. It should be noted that other user authentication methods such as the use of biometrics (e.g., fingerprint scanning or voice signatures) could also be employed.

Figure 8:
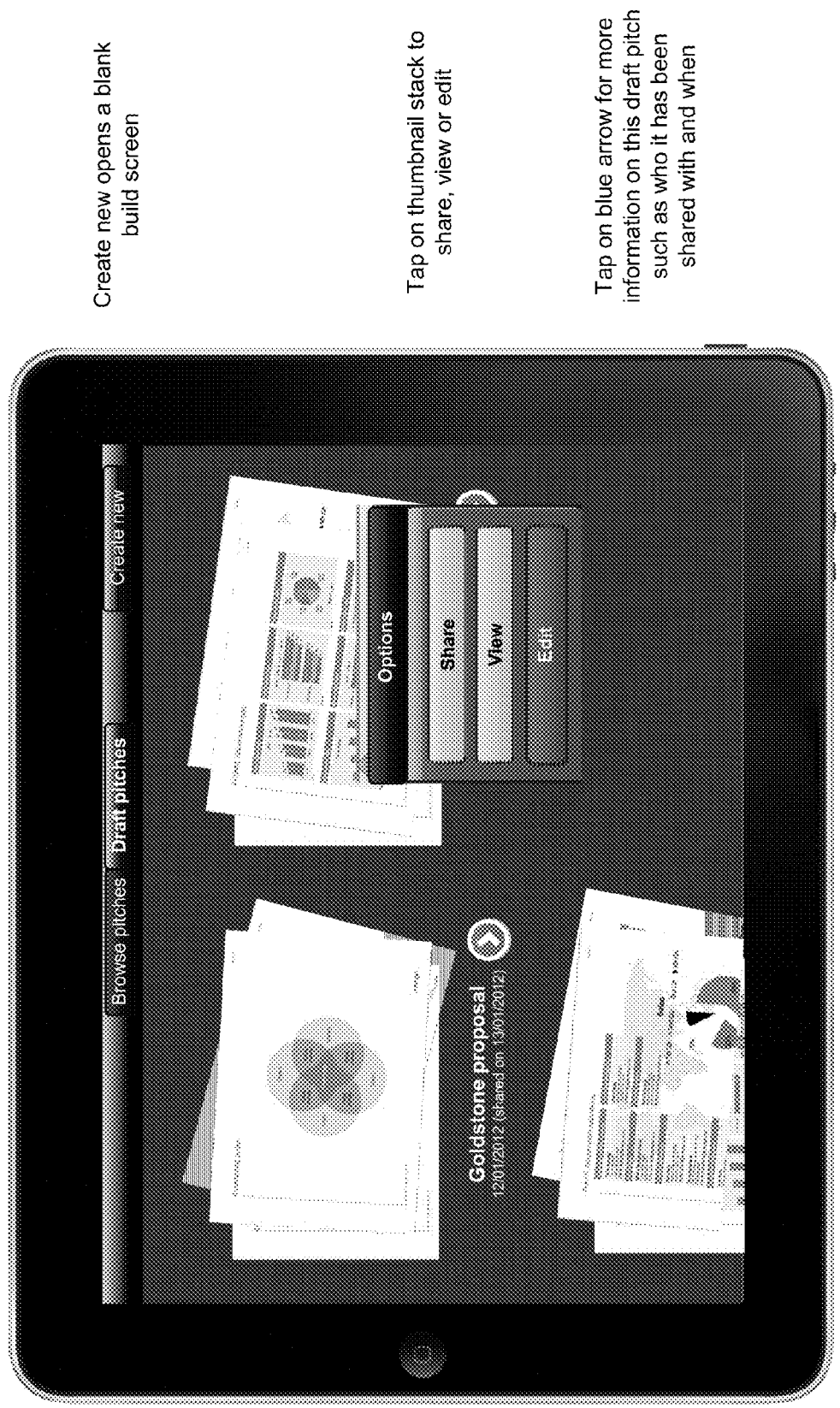

FIG. 8 shows an exemplary screen where the iPad user could browse pitches and has the options of creating new pitches, sharing or viewing or editing existing pitches, and reviewing information related to draft pitches (e.g., with whom a pitch has been shared and when). Using the iPad touch screen interface, the user could select from a number of buttons and arrows for the various options.

Figure 9:
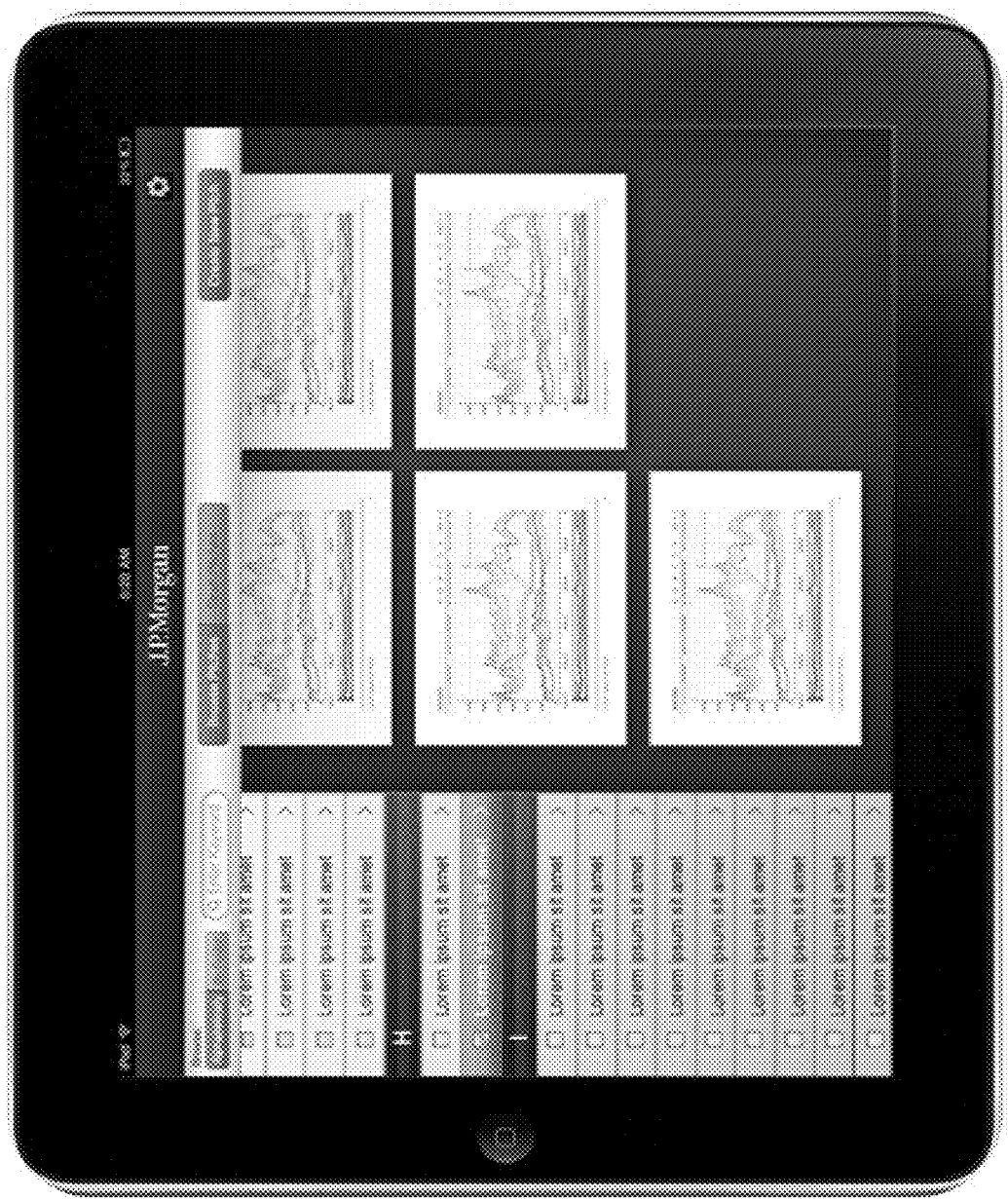

FIG. 9 shows another exemplary screen where the iPad user could browse pitches that are listed in alphabetical order. The screen may also provide a thumbnail preview of the selected pitches.

Figure 10:
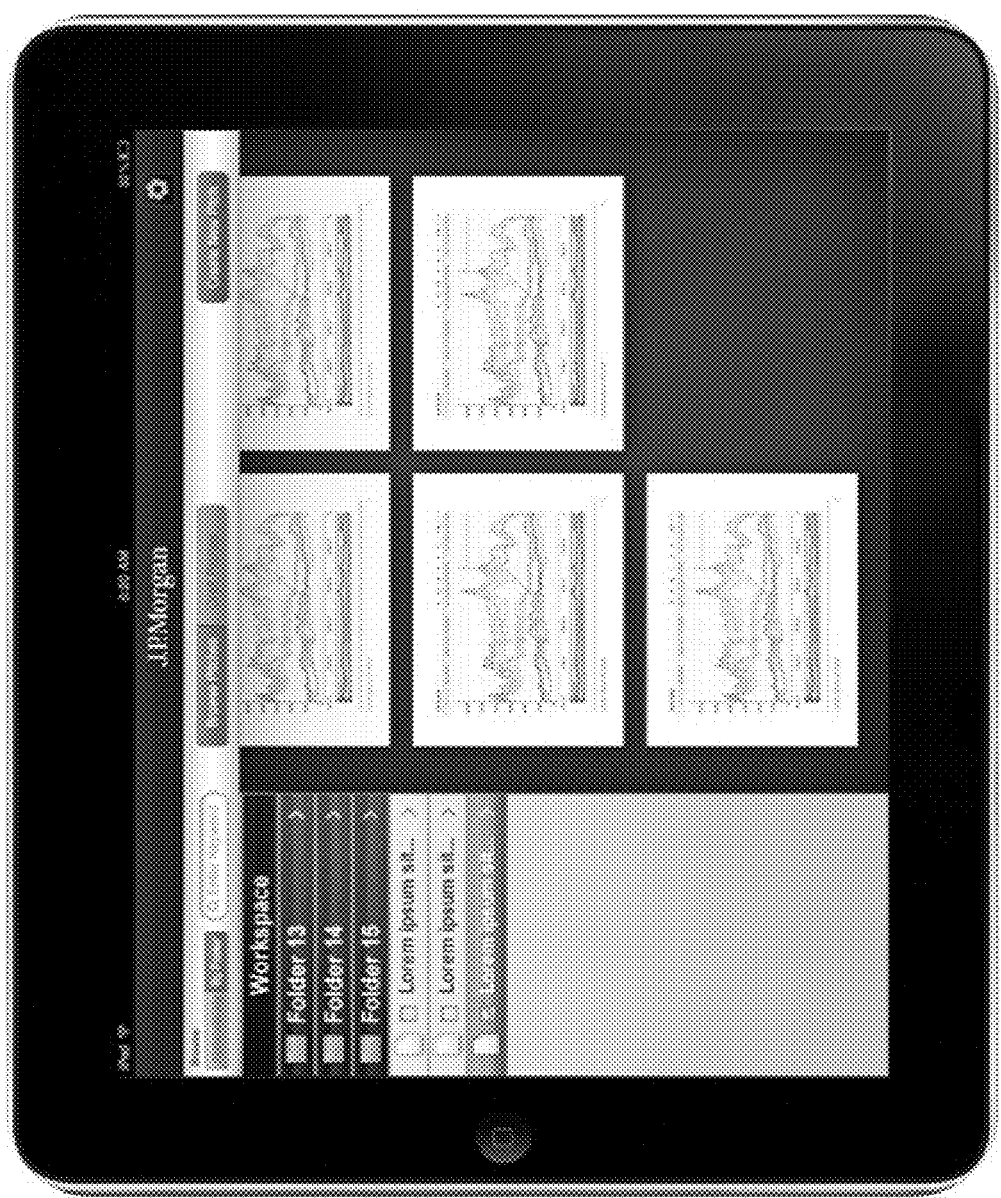

FIG. 10 shows yet another exemplary screen where the iPad user could browse pitches that have been organized by folders.

Figure 11:
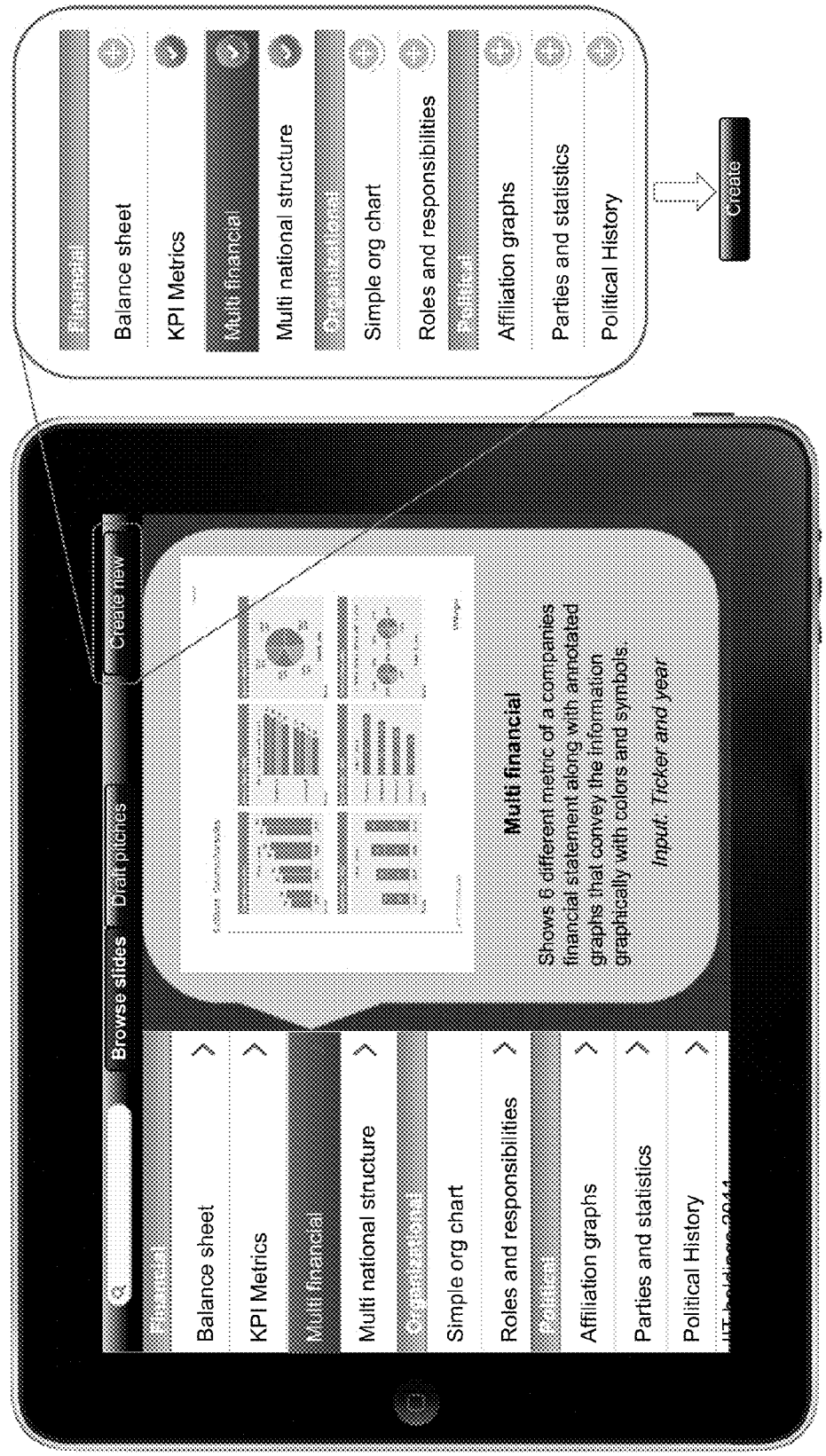

FIG. 11 shows an exemplary screen where the iPad user could browse slides. As a particular slide is selected from a list of slides presented on the left side of the screen, the corresponding slide image may be displayed. In addition, a press of the "Create New" button may allow the user to select some or all of the slides for creation of a new presentation, thereby facilitating an efficient reuse of existing slides.

Figure 12:
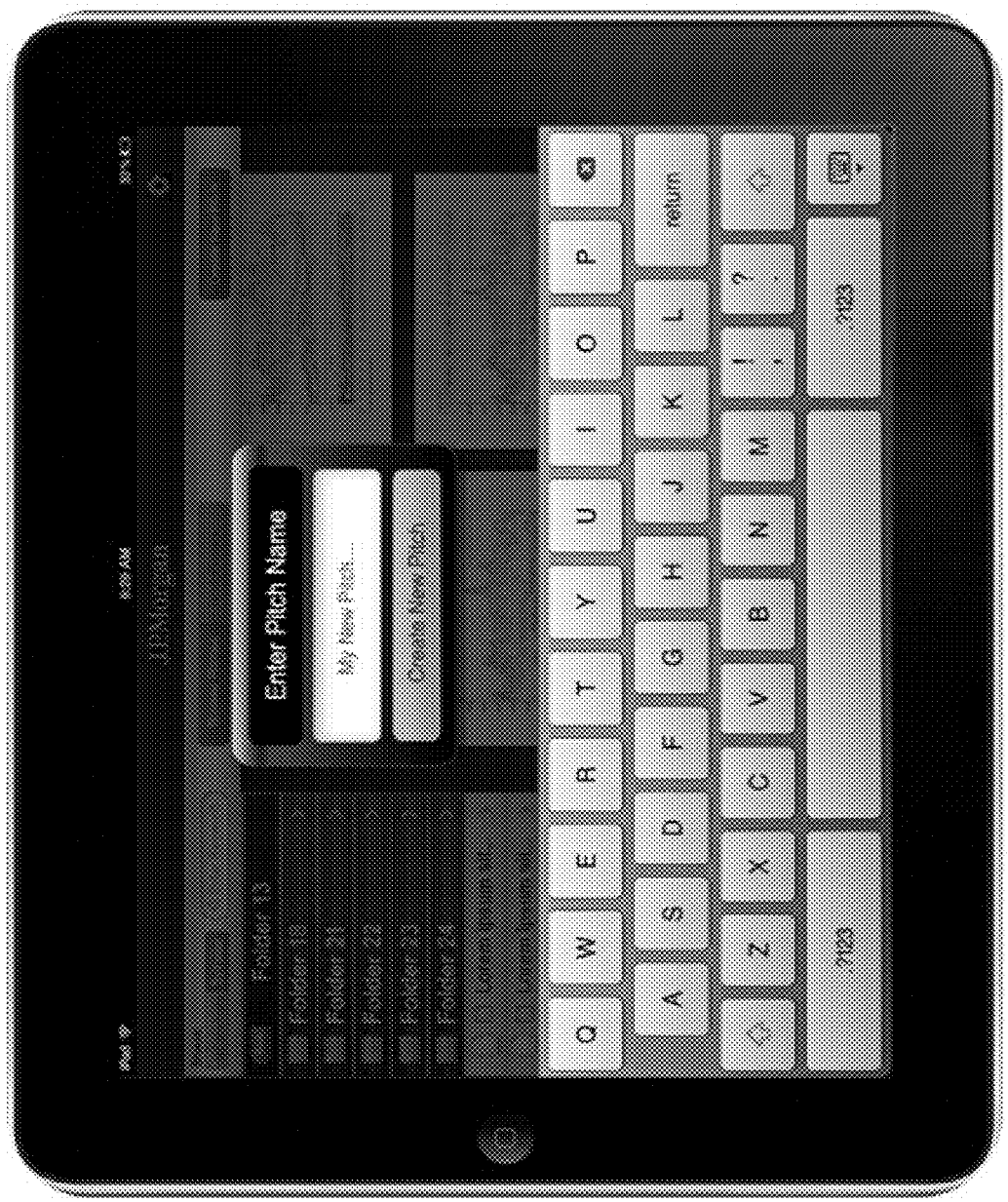

FIG. 12 shows an exemplary screen for naming a new pitch to be created.

Figure 13:
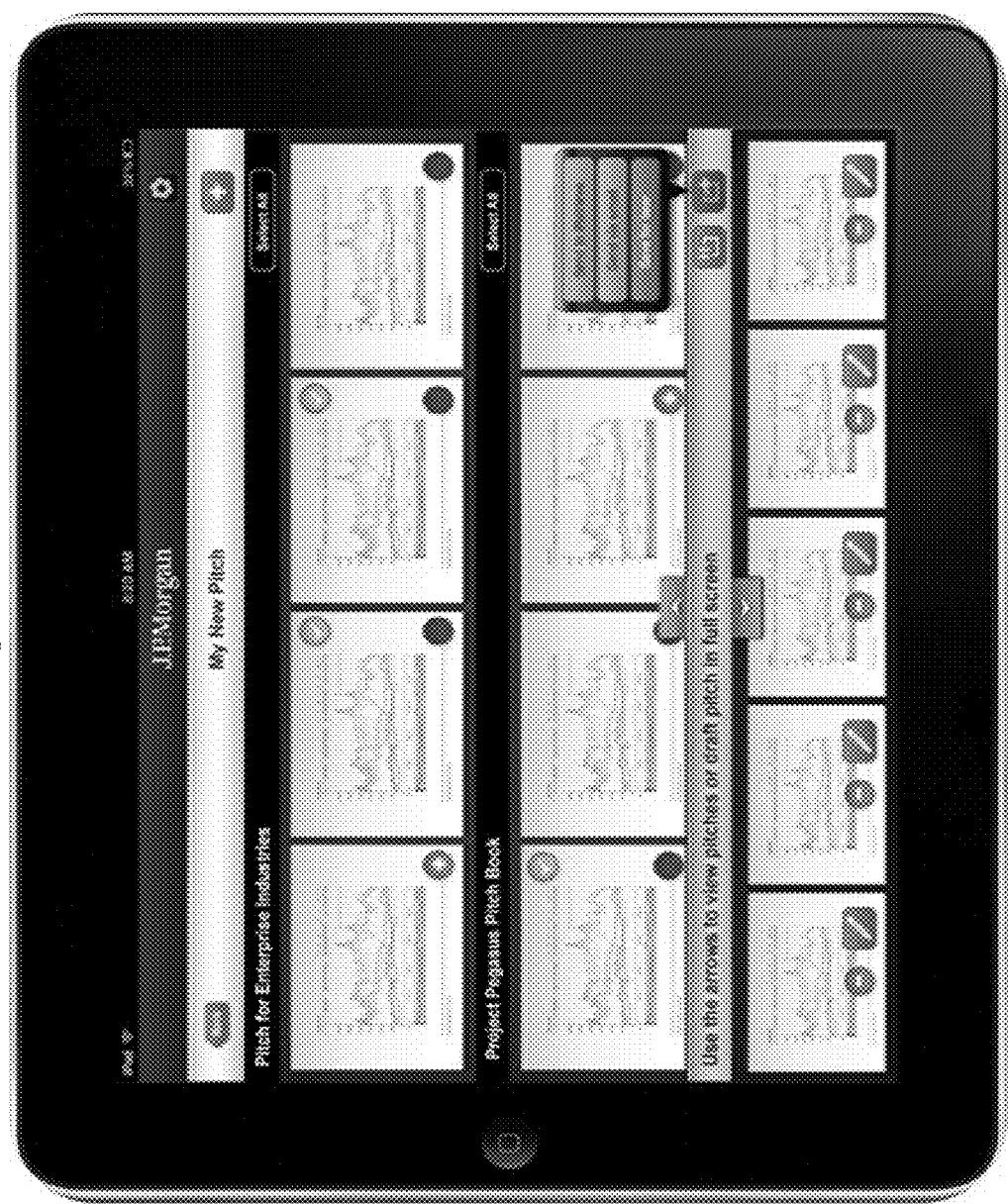

FIG. 13 shows an exemplary screen for creating a new pitch where slide templates (for "Enterprise Industries") are displayed and could be selected for inclusion into the new pitch. Also shown are slides currently included into the new pitch and various options for editing and sending the new pitch or slides.

Figure 14:
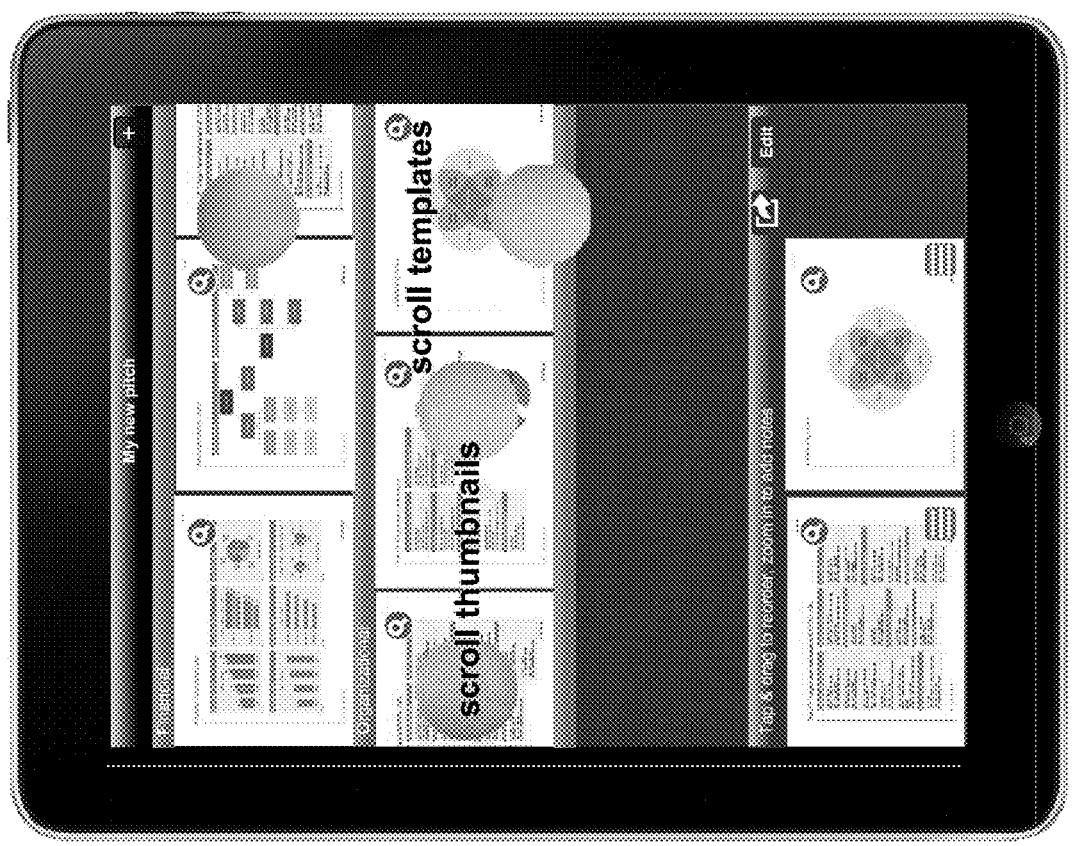

FIG. 14 shows another exemplary screen for creating a new pitch. In this screen, the user could browse various types of presentation templates (e.g., "Financial" or "Organizational") and slide templates (thumbnails) within those presentation templates. For example, a vertical finger swipe on the iPad touch screen scrolls it through different presentation templates each including a collection of thumbnail slides; a horizontal finger swipe within each collection will scroll through the thumbnail slides. Any thumbnail slide could be tapped and dragged into a draft pitch and also could be ordered and edited.

Figure 15:
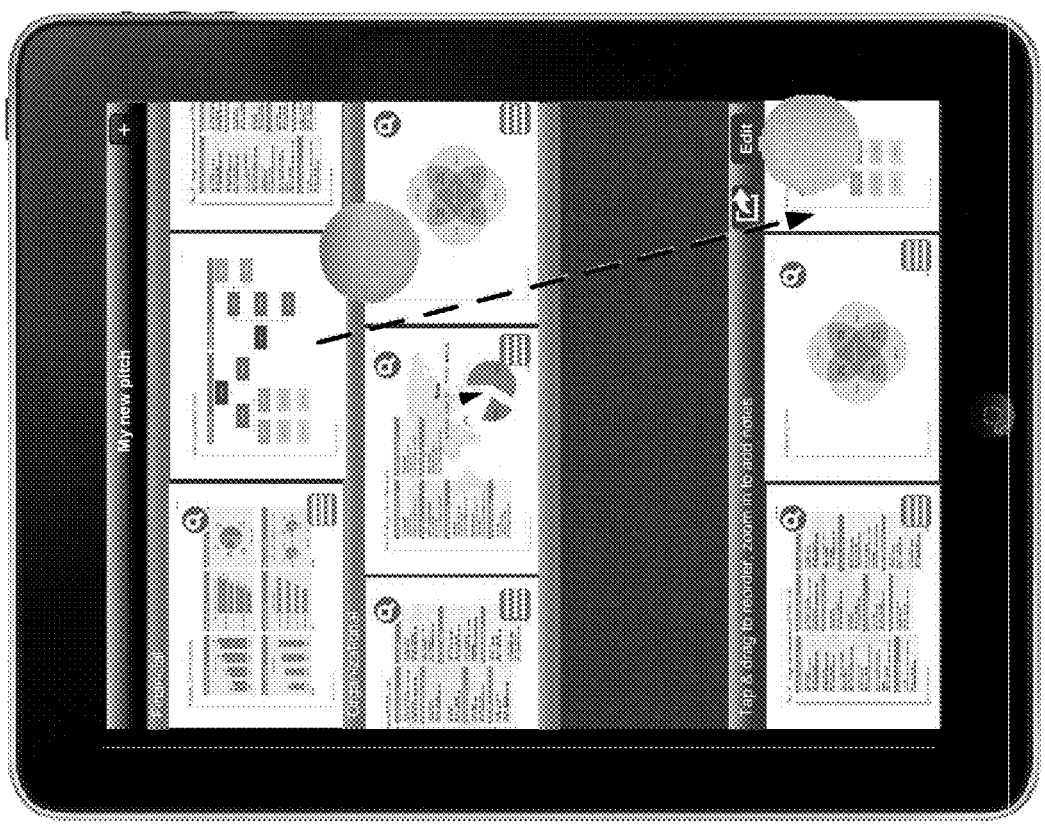

FIG. 15 shows yet another exemplary screen for creating a new pitch where one of the sample slides is dragged into the slide sequence in the "My new pitch" presentation shown at the bottom of the screen.

Figure 16:
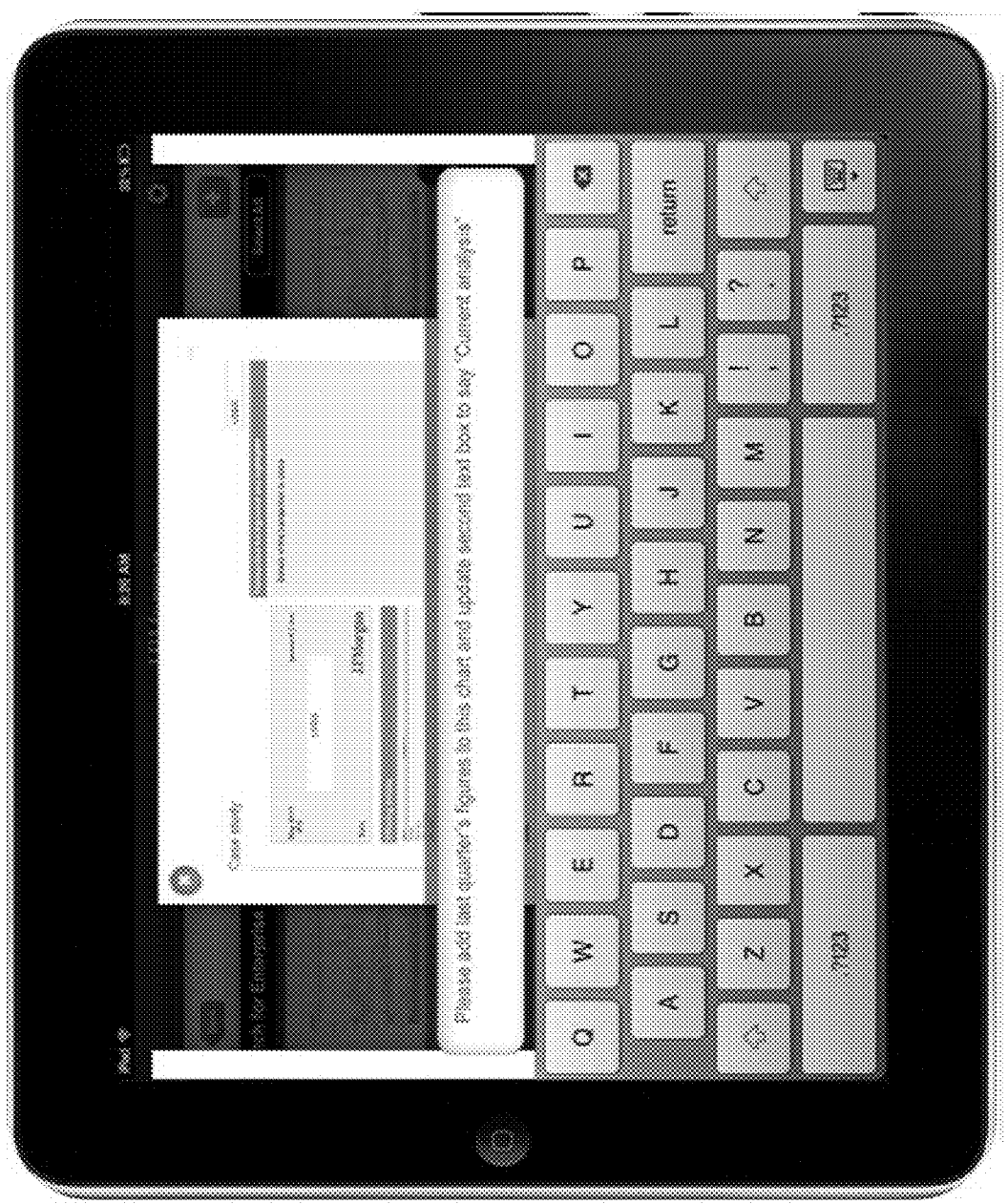

FIG. 16 shows an exemplary screen for entering comments or instructions regarding a particular slide.

Figure 17:
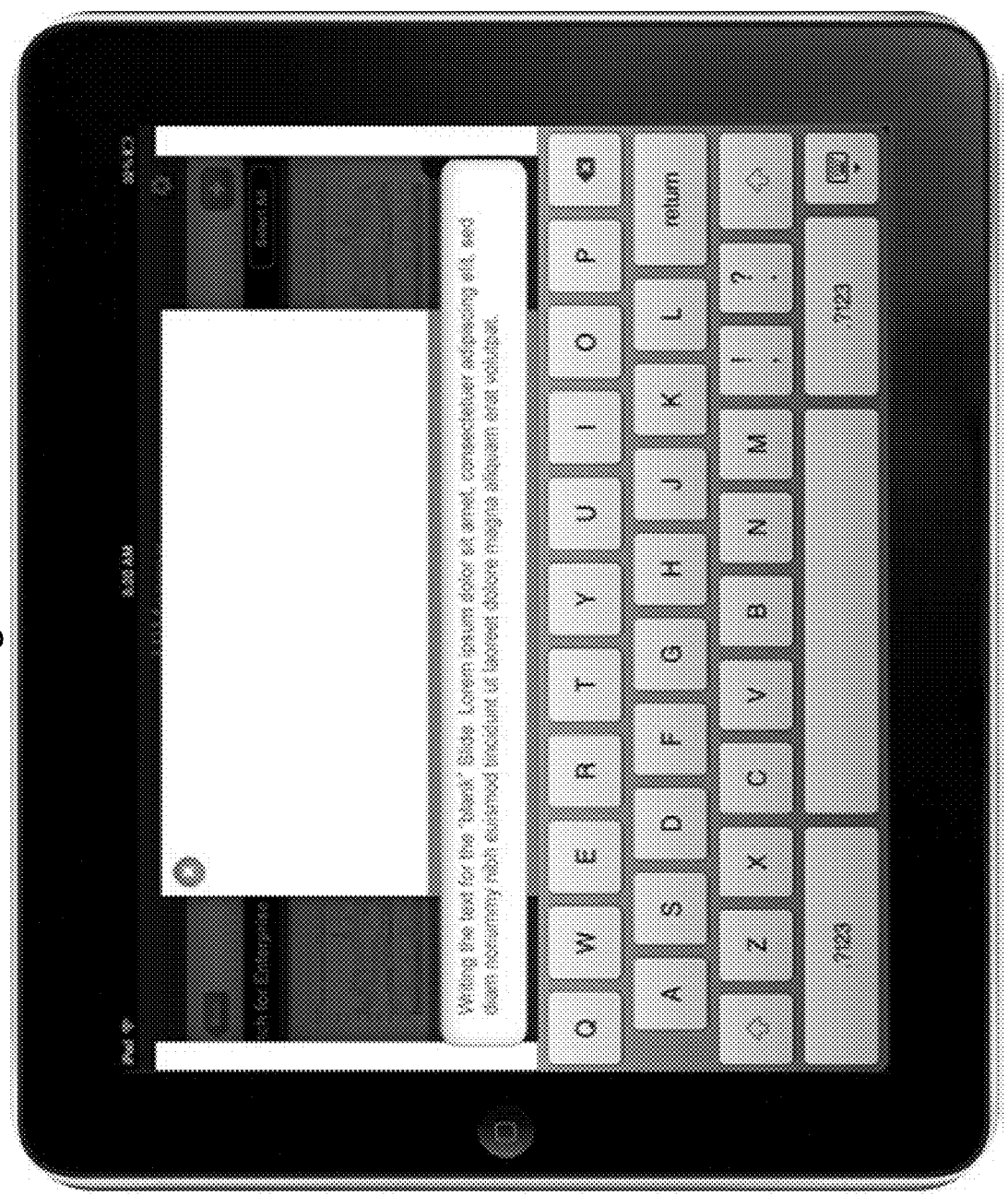

FIG. 17 shows an exemplary screen for entering instructions to create a text box for a blank slide. The text box could be automatically sized and centered based on user input.

Figure 18:
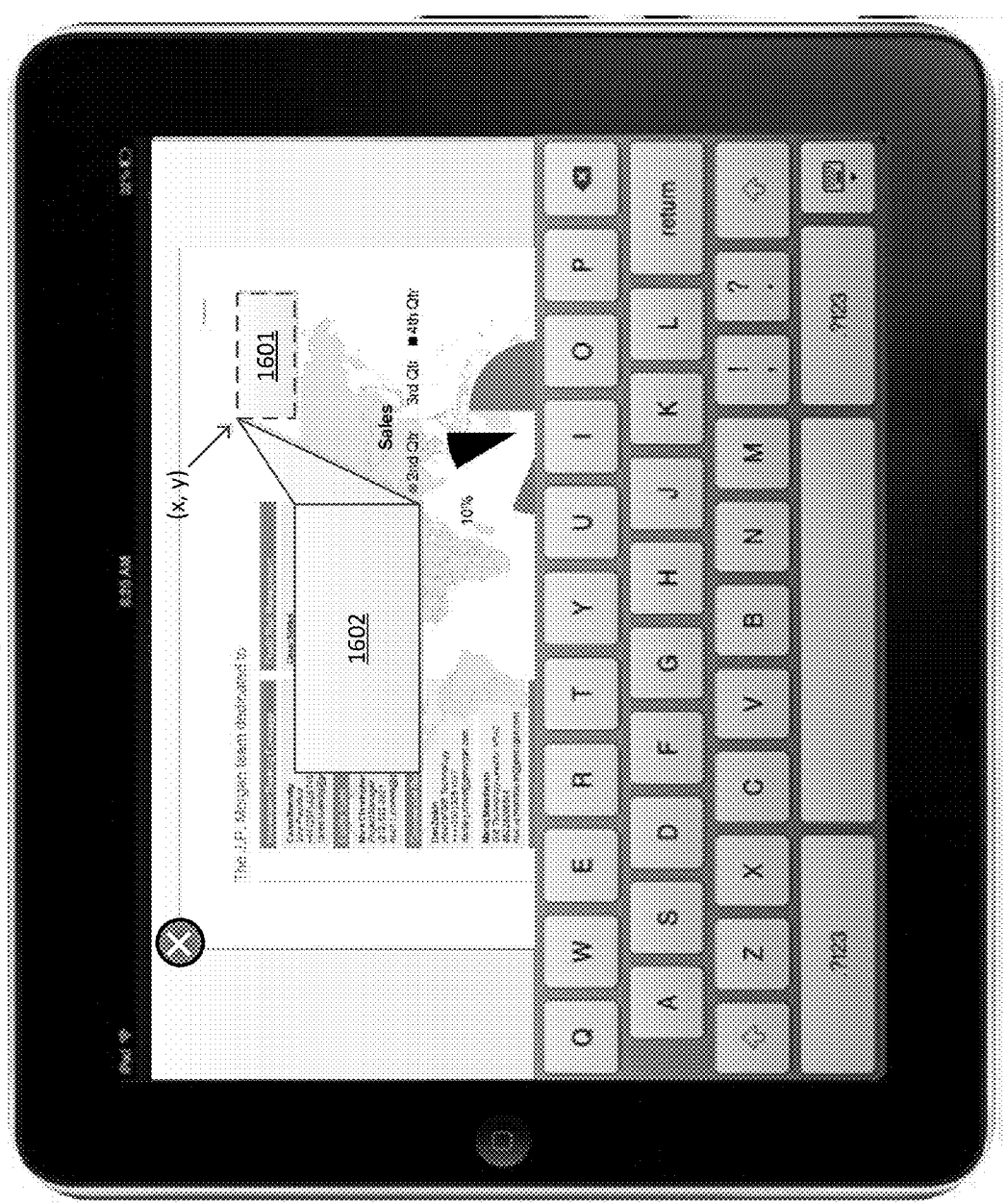

FIG. 18 shows an exemplary screen for creating a new text box 1601 for a particular slide. The user may tap on a desired spot on the slide thumbnail (shown here in a zoomed-in view) and the pixel coordinate of that spot may be recorded as the top left corner of the new text box. An on-screen keyboard and a pop-up box 1602 may then allow the user to type the text to appear in the text box. The size of the text box could be dynamically adjusted based on the number of characters to fill that box. Alternatively, the user may use a finger to drag out a rectangular box 1601 on the slide to define both the location and size of the text box. Many other ways could be used to indicate or determine the location and size of a textbox or other presentation objects.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described herein can be made without departing from the spirit and scope of the invention. Accordingly, such modifications are considered within the scope of the invention as intended to be encompassed by the following claims and their legal equivalents.

What is claimed is:

1. A computer-implemented method for processing presentation materials, the method comprising:
    storing at a server a plurality of presentation files in a native format;
    converting, by the server, at least one of the plurality of presentation files into a thumbnail format file;
    downloading at least one thumbnail format file from the server to a portable computing device;
    receiving, at the server and from the portable computing device, a new presentation or a modified presentation as a thumbnail format file;
    recompiling, by the server, said received thumbnail format file into a native format presentation file; and
    storing at the server said recompiled native format presentation file.

2. The computer-implemented method of claim 1, wherein the recompiled native format presentation file is a Microsoft® PowerPoint® file.

3. The computer-implemented method of claim 1, wherein the thumbnail format file is a PDF file.

4. The computer-implemented method of claim 1, further comprising:
    providing a mobile application executable on said portable computing device to enable a user to view the at least one thumbnail format file.

5. The computer-implemented method of claim 1, further comprising:
    providing a mobile application executable on said portable computing device to enable a user to edit the at least one thumbnail format file.

6. The computer-implemented method of claim 1, further comprising:
    providing a mobile application executable on said portable computing device to enable a user to add and delete slides from the at least one thumbnail format file.

7. The computer-implemented method of claim 1, further comprising:
    providing a client-side application executable on a client computer to allow a user to access the plurality of native format presentation files stored on the server.

8. The computer-implemented method of claim 7, further comprising:
enabling the user to select a plurality of native format presentation files to be downloaded to the portable computing device of said user.

9. The computer-implemented method of claim 1, further comprising:
receiving, from a user, an instruction to email the recompiled native format presentation file; and
transmitting an email message including the recompiled native format presentation file to a recipient as if the email message originates from the user.

10. The computer-implemented method of claim 9, further comprising:
generating a record of the transmission of the email message.

11. The computer-implemented method of claim 1, further comprising:
embedding additional content in the recompiled native format presentation file based on at least one instruction received with the new presentation or the modified presentation.

12. The computer-implemented method of claim 11, wherein the additional content is selected from a group consisting of:
an audio clip;
a video clip;
an image;
an animation sequence;
a graph or chart; and
a link.

13. The computer-implemented method of claim 11, wherein at least a portion of the additional content is of a dynamic type.

14. The computer-implemented method of claim 1, wherein the received new presentation or modified presentation in thumbnail format comprises one or more edits by a user of the portable computing device.

15. The computer-implemented method of claim 14, wherein the one or more edits are correlated to the thumbnail format file with coordinates indicating an intended placement of the one or more edits in the received new presentation or modified presentation.

16. The computer-implemented method of claim 1, wherein the received new presentation or modified presentation in thumbnail format includes or is accompanied by one or more variable fields whose values are used to populate the recompiled native format presentation file.

17. The computer-implemented method of claim 1, further comprising:
imposing at least one security restriction on at least one of the plurality of presentation files and the recompiled native format presentation file.

18. The computer-implemented method of claim 1, further comprising:
inserting a blocking code in a header of the recompiled native format presentation file, wherein the presence of the blocking code prevents the recompiled native format presentation file from being emailed to any recipient outside an organization.

19. The computer-implemented method of claim 1, further comprising:
generating a file wrapper for the recompiled native format presentation file, the file wrapper causing a notice to be received by the server when the recompiled native format presentation file is opened by a recipient.

20. The computer-implemented method of claim 1, further comprising:
including at least one watermark in the recompiled native format presentation file, the at least one watermark comprising metadata concerning the recompiled native format presentation file.

21. The computer-implemented method of claim 1, wherein the recompiling further comprises automatically determining display parameters for the new presentation or the modified presentation.

22. A computer-implemented system for processing presentation materials, the system comprising:
a server having at least one computer processor and at least one storage medium, the server being configured to perform the following:
storing at the server a plurality of presentation files in a native format;
converting, by the server, at least one of the plurality of presentation files into a thumbnail format file;
downloading at least one thumbnail format file from the server to a portable computing device;
receiving, at the server and from the portable computing device, a new presentation or a modified presentation as a thumbnail format file;
recompiling, by the server, said received thumbnail format file into a native format presentation file; and
storing at the server said recompiled native format presentation file.

23. The computer-implemented system of claim 22, further comprising the portable computing device of a first user configured to download, display, and manipulate the at least one thumbnail format file.

24. The computer-implemented system of claim 23, further comprising a second portable computing device of a second user.

25. The computer-implemented system of claim 22, further comprising a client computer configured to allow a user to access at least one of the plurality of native format presentation files stored on the server.

26. A non-transitory computer readable medium containing computer readable code for processing presentation materials, the computer readable code being configured to cause at least one processor to perform the following:
storing at a server a plurality of presentation files in a native format;
converting, by the server, at least one of the plurality of presentation files into a thumbnail format file;
downloading at least one thumbnail format file from the server to a portable computing device;
receiving, at the server and from the portable computing device, a new presentation or a modified presentation as a thumbnail format file;
recompiling, by the server. said received thumbnail format file into a native format presentation file; and
storing at the server said recompiled native format presentation file.

27. The computer readable medium of claim 26, further comprising a mobile application executable by the portable computing device to download, display, and manipulate the at least one thumbnail format file.

28. The computer readable medium of claim 26, further comprising a client-side application executable by a client computer to allow a user to access at least one of the plurality of native format presentation files stored on the server.

* * * * *